United States Patent
Halverson et al.

(10) Patent No.: US 8,219,539 B2
(45) Date of Patent: Jul. 10, 2012

(54) SEARCH QUERIES WITH SHIFTING INTENT

(75) Inventors: Alan Dale Halverson, Verona, WI (US);
Krishnaram Kenthapadi, Mountain View, CA (US); Nina Mishra, Newark, CA (US); Aleksandrs Slivkins, San Jose, CA (US); Umar Ali Syed, Philadelphia, PA (US)

(73) Assignee: Microsoft Corporation, Redmond, WA (US)

( * ) Notice: Subject to any disclaimer, the term of this patent is extended or adjusted under 35 U.S.C. 154(b) by 343 days.

(21) Appl. No.: 12/419,363

(22) Filed: Apr. 7, 2009

(65) Prior Publication Data
US 2010/0257164 A1  Oct. 7, 2010

(51) Int. Cl.
*G06F 7/00* (2006.01)
*G06F 17/30* (2006.01)

(52) U.S. Cl. ......... 707/706; 707/746; 707/765; 707/770

(58) Field of Classification Search .......... 707/706, 707/746, 765, 770
See application file for complete search history.

(56) References Cited

U.S. PATENT DOCUMENTS

| | | | |
|---|---|---|---|
| 6,671,681 B1* | 12/2003 | Emens et al. | 707/706 |
| 6,675,159 B1* | 1/2004 | Lin et al. | 1/1 |
| 6,832,218 B1* | 12/2004 | Emens et al. | 1/1 |
| 6,925,453 B1* | 8/2005 | Bergman et al. | 706/20 |
| 7,552,112 B2* | 6/2009 | Jhala et al. | 707/999.003 |
| 7,716,236 B2* | 5/2010 | Sidhu et al. | 707/766 |
| 7,747,639 B2* | 6/2010 | Kasperski et al. | 707/765 |
| 8,032,507 B1* | 10/2011 | Bayardo et al. | 707/706 |
| 2003/0217052 A1* | 11/2003 | Rubenczyk et al. | 707/3 |
| 2004/0162834 A1* | 8/2004 | Aono et al. | 707/100 |
| 2005/0050024 A1* | 3/2005 | Ellis et al. | 707/3 |
| 2006/0149692 A1* | 7/2006 | Hercus | 706/26 |
| 2006/0184481 A1* | 8/2006 | Zhang et al. | 706/45 |
| 2006/0248068 A1* | 11/2006 | Chien et al. | 707/4 |
| 2006/0248073 A1* | 11/2006 | Jones et al. | 707/5 |
| 2007/0044010 A1* | 2/2007 | Sull et al. | 715/500.1 |
| 2007/0050351 A1* | 3/2007 | Kasperski et al. | 707/4 |
| 2007/0061360 A1* | 3/2007 | Holcombe et al. | 707/103 R |
| 2007/0112840 A1* | 5/2007 | Carson et al. | 707/102 |

(Continued)

FOREIGN PATENT DOCUMENTS
WO   2008083504 A1   7/2008

OTHER PUBLICATIONS

"Chapter 10—Working with Temporal Data"—Professional and Applied Computing, Expert SQL server 2005 Development, Springer Link 2007 (pp. 315-373).*

(Continued)

*Primary Examiner* — John E Breene
*Assistant Examiner* — Anh Ly
(74) *Attorney, Agent, or Firm* — Microsoft Corporation

(57) ABSTRACT

Techniques and systems are disclosed for returning temporally-aware results from an Internet-based search query. To determine if a query is temporally-based one or more query features are collected and input into a trained classifier, yielding a temporal classification for the query. Further, if a query is classified as temporal, the query results are shifted by determining an alternate set of results for the query, and returning one or more alternate results to one or more users. Based on user interactions with the one or more alternate results, the classifier can be updated, for example, by changing the query to a non-temporal query if the user interactions identify it as such.

20 Claims, 9 Drawing Sheets

U.S. PATENT DOCUMENTS

| | | | | |
|---|---|---|---|---|
| 2007/0192279 | A1* | 8/2007 | Van Luchene | 707/1 |
| 2007/0214131 | A1* | 9/2007 | Cucerzan et al. | 707/5 |
| 2008/0005071 | A1* | 1/2008 | Flake et al. | 707/3 |
| 2008/0027768 | A1* | 1/2008 | Thurlow et al. | 705/6 |
| 2008/0052268 | A1* | 2/2008 | Koudas et al. | 707/2 |
| 2008/0071740 | A1* | 3/2008 | Jhala et al. | 707/3 |
| 2008/0222093 | A1* | 9/2008 | Fan et al. | 707/2 |
| 2008/0270376 | A1* | 10/2008 | Svore et al. | 707/5 |
| 2009/0100018 | A1* | 4/2009 | Roberts | 707/3 |
| 2009/0125510 | A1* | 5/2009 | Graham et al. | 707/5 |
| 2009/0327224 | A1* | 12/2009 | White et al. | 707/3 |
| 2010/0014766 | A1* | 1/2010 | Akenine-Moller et al. | 382/239 |
| 2010/0146012 | A1* | 6/2010 | Beaudreau et al. | 707/803 |
| 2010/0161605 | A1* | 6/2010 | Gabrilovich et al. | 707/736 |
| 2010/0235375 | A1* | 9/2010 | Sidhu et al. | 707/765 |

OTHER PUBLICATIONS

Gosink et al.—"Query-Driven Visualization of Time-Varying Adaptive Mesh Refinement Data"—IEEE Transactions on Visualization and Computer Graphics, vol. 14, No. 6, Nov./Dec. 2008 (pp. 1715-1722).*

Cicirello et al., "The Max K-Armed Bandit: A New Model of Exploration Applied to Search Heuristic Selection", 2005, http://www.ri.cmu.edu/pub_files/pub4/cicirello_vincent_2005_1/cicirello_vincent_2005_1.pdf.

Garcia, E., "Mi Islita", 2006, pp. 1-10, http://www.miislita.com/semantics/c-index-5-temporal-co-occurrence.html.

Agarwal, Deepak, "Beyond Search: Computational Intelligence for the Web", Dec. 12-13, 2008, http://research.microsoft.com/en-us/projects/beyond_search/talkabstracts.aspx.

Zhang, Yi, "Bayesian Graphical Models for Adaptive Filtering", http://www.lti.cs.cmu.edu/research/thesis/2005/yi_zhang.pdt.

Pandey, Sandeep, "Information Mediation in the Presence of Constraints and Uncertainties", May 2008, http://reports-archive.adm.cs.cmu.edu/anon/2008/CMU-CS-08-125.pdf.

Auer, et al., "Finite-Time Analysis of the Multiarmed Bandit Problem", Machine Learning, pp. 47, 235-256, 2002 http://homes.dsi.unimi.it/~cesabian/Pubblicazioni/ml-02.pdf.

Radlinski, et al., "Learning Diverse Rankings with Multi-Armed Bandits", 2008 http://radlinski.org/papers/Radlinski08RankedBandits.pdf.

Auer, et al., "The Non-Stochastic Multi-Armed Bandit Problem", pp. 322-331, 1995, http://cse.ucsd.edu/~yfreund/papers/bandits.pdf.

Langford, et al., "The Epoch-Greedy Algorithm for Contextual Multi-Armed Bandits", http://books.nips.cc/files/nips20/NIPS2007_0785.pdf.

Kakade, et al., "Efficient Bandit Algorithms for Online Multiclass Prediction", 2008, http://icml2008.cs.helsinki.fi/papers/511.pdf.

Mukherjee et al., "Fresher Related Search Suggestions", Jun. 12, 2008, pp. 1-5, http://googleblog.blogspot.com/2008/06/fresher-related-search-suggestions.html.

Cesa-Bianchi et al., "Worst-Case Analysis of Selective Sampling for Linear Classification", Journal of Machine Learning Research 7 (2006), pp. 1205-1230, http://jmlr.csail.mit.edu/papers/volume7/cesa-bianchi06b/cesa-bianchi06b.pdf.

Cesa-Bianchi et al., "Minimizing Regret with Label Efficient Prediction", IEEE Transactions on Information Theory, vol. 51, No. 6, Jun. 2005, pp. 2152-2162, http://ieeexplore.ieee.org/stamp/stamp.jsp.?arnumber=1435657&isnumber=30934.

Helmbold, et al., "Apple Tasting and Nearly One-Sided Learning", 1992, pp. 493-502, http://ieeexplore.ieee.org/stamp/stamp.jsp?arnumber=267802&isnumber=6693.

Li, et al., "Knows What It Knows: A Framework for Self-Aware Learning", 2008 http://www.research.rutgers.edu/~lihong/pub/Li08Knows.pdf.

Kleinberg, Jon, "Bursty and Hierarchical Structure in Streams", 2002, http://www.cs.cornell.edu/home/kleinber/bhs.pdf.

Jones et al., "Temporal Profiles of Queries", ACM Transactions on Information Systems, vol. 25, No. 3, Article 14, Jul. 2007, http://delivery.acm.org/10.1145/1250000/1247720/a14-jones.pdf?key1=1247720&key2=1797653321&coll=GUIDE&dl=GUIDE&CFID=20644520&CFTOKEN=85690296.

Helmbold et al., "Online Learning with Linear Loss Constraints", 2000.

* cited by examiner

SEARCH QUERIES WITH SHIFTING INTENT

BACKGROUND

Internet-based searches are typically performed using an online search engine that is associated with a website. Often, results returned for a query can include, among other things, links to web-pages that comprise elements of the query, query suggestions for formulating a query, and links to other online items that may comprise the query, such as videos, photos, etc.

Search engines that provide Internet-based searching typically utilize web-crawlers that continually crawl through Internet-based content and store information relating to the content that has been crawled. In this way, for example, a search engine can quickly return web-links or suggestions from the data stored from their web-crawling. Therefore, most Internet-based searching is limited to information that has been identified by a search engine's associated web-crawler.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A meaning of an Internet-based search query can shift over time, thereby being temporal in nature. For example, a meaning of the query "independence Day" can mean United States Independence Day around July $4^{th}$, Indian Independence Day around August $15^{th}$, and may even mean the movie of that title around the time of its release. Typically, most search engines return a same set of results for a query each time the query is posed to the engine. These static-type query returns are due in part to a presence of a ranking system that is relatively static. Those engines that rank search results based merely on overall popularity may be temporally blind when a meaning of a query shifts quickly or unexpectedly.

A query that is experiencing a shift in semantic meaning may be called a temporal query. For example, where a query for coast guard may be quite common when users search for information about the Coast Guard, if a dramatic and noteworthy Coast Guard rescue recently took place, users querying "coast guard" may be expecting to see results that discuss the recent events. In this example, the query "coast guard" is a temporal query, as the semantic meaning may have suddenly changed for many users.

Accordingly, techniques and systems are disclosed herein for returning temporally-aware results from an Internet-based search query; adapting search results (e.g., web-links to news articles, query suggestions, websites, etc.) to temporal queries. These techniques and systems can adapt to temporal results quickly (e.g., within minutes of a temporal shift); can provide accurate temporally related results; can be incorporated to be automatic instead of having a person identify temporal queries; can be applied generally instead of tracking specific queries; and can be exploratory, finding alternate and sometimes unexpected results to temporal queries.

In one embodiment, determining if a query is temporally-based (or not) comprises collecting one or more features of the query, for example, where query features may include user interactions and query characteristics. In this embodiment, the query features can be input into a trained classifier, for example, which has been trained to recognize temporal queries. Further, if a query is classified as temporal, the returned results for the query can be shifted, which can comprise determining an alternate set of results for the query, for example, using a search engine, and returning one or more alternate results to one or more users. Based on user interactions with the one or more alternate results, the classifier can be updated, for example, by changing the query to a non-temporal query if the user interactions identify it as such.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
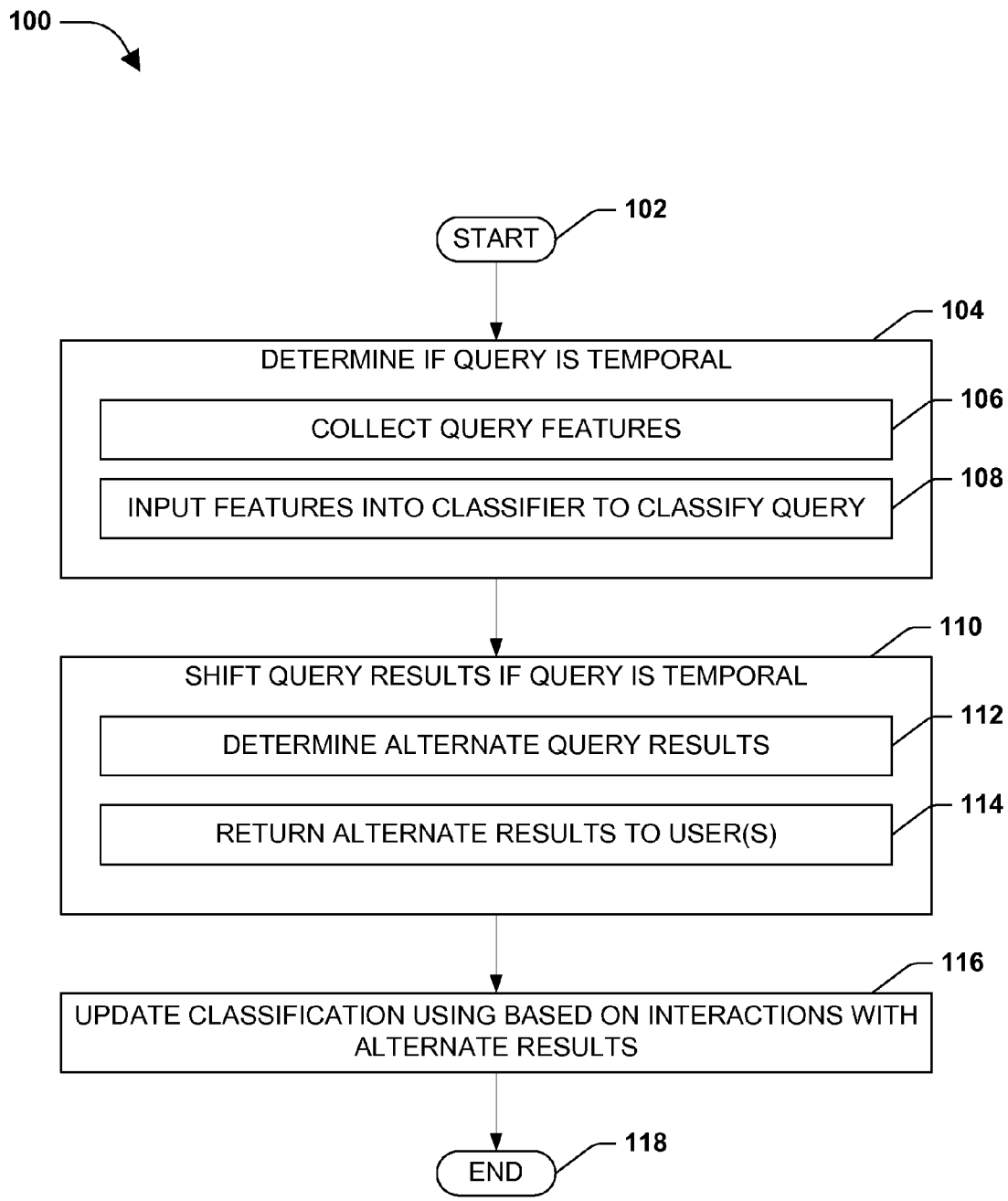
FIG. 1 is a flow chart diagram of an exemplary method for returning temporally-aware results from an Internet-based search query.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that can help return results from a query that accommodate a temporal nature of some queries. FIG. 1 is a flow chart diagram of an exemplary method 100 for returning temporally-aware results from an Internet-based search query. The exemplary method 100 begins at 102 and involves determining if a query is temporally-based, at 104. For example, results returned when a query is posed may include, among other things, Internet search results and query suggestions. Further, a query may be expected to return different results at different times, indicating its temporal nature.

Figure 2:
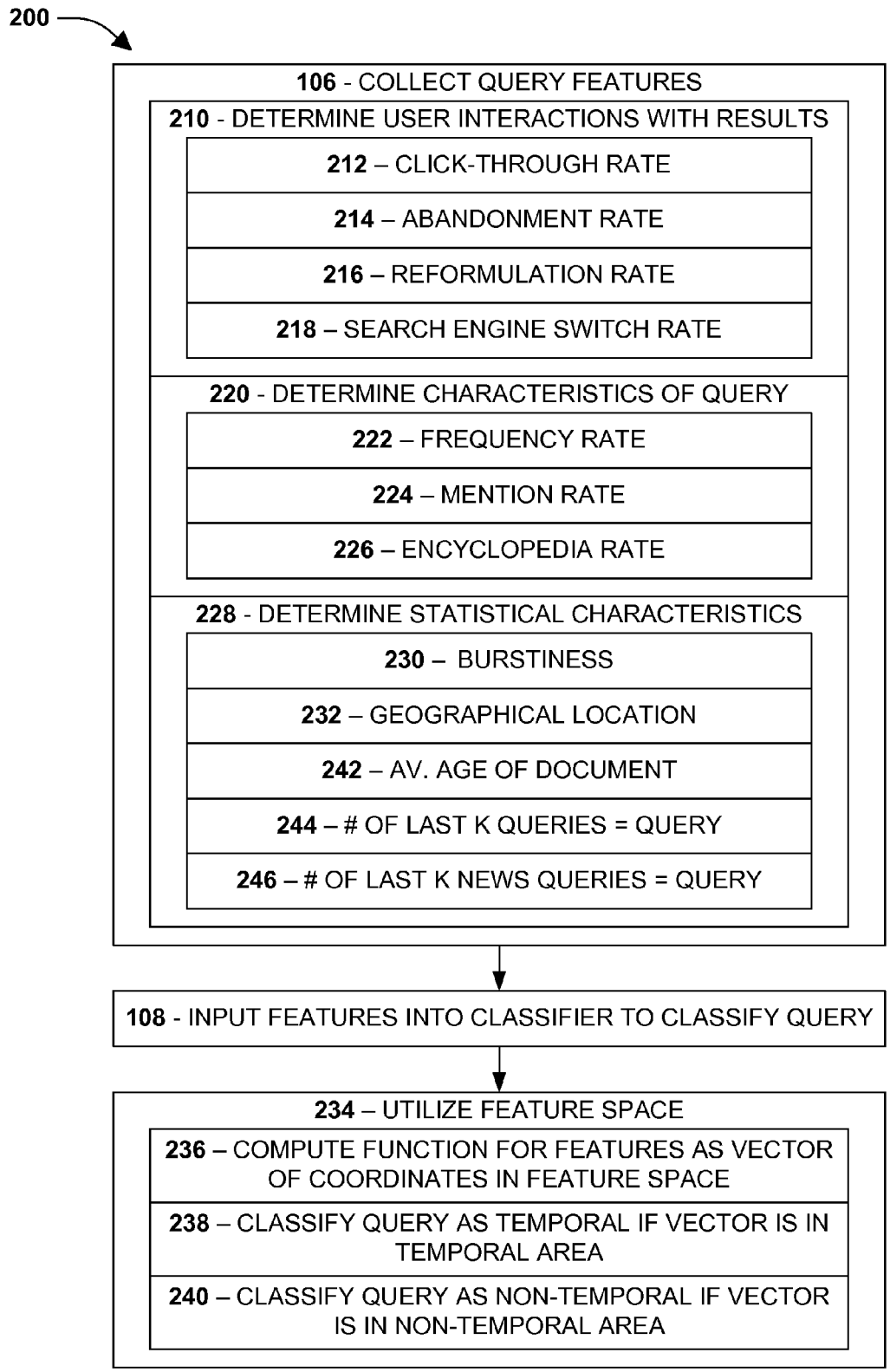
FIG. 2 is one exemplary embodiment of a portion of a method, where it can be determine whether a query is temporally-based.

At 106, determining if a query is temporally-based comprises collecting one of more features of the query. A query may comprise various features that can be used to determine whether the query is temporal, for example. FIG. 2 is one exemplary embodiment 200 of a portion of a method, where it can be determined whether a query is temporally-based. In this exemplary embodiment 200, collecting one of more feature of the query 106 can comprise determining how a user interacts with a first set of results returned for the query, at 210. For example, after the query is posed in a search engine, one can monitor how a user interacts with returned results to identify some features of the query.

At 212, a user interaction, used as query feature, can comprise a click-through rate on returned results. A click-through rate can be a rate at which users click on (interact with) the results of the query, for example. In one embodiment, the click-through rate can be limited to results from a first set of returned results (e.g., top search results resulting in a "top click-through rate). For example, a query for "Independence Day" may be expected to return different results to different people at different times of a year (e.g., July $4^{th}$ in the USA, August $15^{th}$ in India, movie release, etc.). Identifying a click-through rate on returned results may indicate whether the return results are meeting a user's expectations for the query, for example.

At 214, another user interaction, used as query feature, may include an abandonment rate, comprising a rate that a query is abandoned after results are returned. For example, if the query "Independence Day" merely returns results for the $4^{th}$ of July, a user expecting to see results about the movie of the same title may abandon their search, for example, frustrated by their query. An abandonment rate may indicate that a temporal shift has occurred in the meaning of the query, for example, around a time of the movie release. Further, at 218, a user may switch search engines to pose the same query, for example. Therefore a search engine switch rate, comprising a rate that a user switches to an alternate search engine after results are returned, may be an indication of a temporal shift in the query.

At 216, another user interaction, used as query feature, may include a reformulation rate, comprising a rate at which a user does not interact with returned results and subsequently initiates an alternate query. Instead of abandoning their query, or switching search engines, a user may reformulate the query (e.g., write the query in a different way), for example. In this example, a user may change "Independence Day" to "Independence Day the movie," which can indicate that a temporal shift has occurred in the meaning of the query (e.g., from $4^{th}$ of July to the movie around the time of the movie release).

In exemplary embodiment 200, at 220, collecting one of more feature of the query 106 can comprise determining characteristics of the query. In one embodiment, a query characteristic can include a frequency rate comprising a rate that the query is posed, at 222. For example, a search engine may track that a query for "Independence Day" is increasing in frequency around the beginning of August. In this example, this may indicate a temporal shift in an intent for the query from the United State's Independence Day in July to India's Independence Day on August $15^{th}$.

Further, at 224, a query characteristic can include a mention rate, comprising a rate that the query is described in reference articles. For example, Internet-based news article, (micro)blogs, etc can be searched for the query and a rate that the query is mentioned in these references can be tracked. In this example, an increase in query mentions may indicate a temporal shift in the meaning of the query, for example, around India's Independence Day. Further, in one embodiment, Internet-based encyclopedias (e.g., Wikipedia®) may be used to indicate whether a temporal shift has occurred for a query. At 226, if an article comprising the query in an online encyclopedia has been recently updated it may be used as a feature to indicate a temporal query.

In exemplary embodiment 200, at 228, collecting one or more feature of the query 106 can comprise determining statistical-based characteristics of burstiness, at 230, and/or geographical location, at 232, for a query. In one embodiment, burstiness of user interactions with a first set of results returned for the query and characteristics of the query can comprise a sharp increase in the user interactions described in 210 above. For example, a sharp increase in a click-through rate, abandonment, or reformulation of a query may indicate that a meaning for the query has shifted temporally.

Further, a geographical location 232 for posed queries can be monitored. In one embodiment, an increase in a particular query for a particular geographical location may indicate a shift in meaning for that query. For example, a query for "earthquake" may be relatively common; however, if there were a spike in the rate of the query in a particular geographic location it may indicate that an earthquake has occurred in the vicinity. In this embodiment 200, an average age of a document returned by a query search, and/or chosen by a user (e.g., clicked on) may be utilized as a query feature, at 242. Further, a percentage of a recent number of queries (K number of queries) that have been posed to a search engine, which are similar (e.g., when aggregated into query groups) to the current query can be used as a query feature. Additionally, a percentage of a recent number of news-based queries (K number of queries) that have been posed to a search engine, which are similar to the current query can also be used as a query feature. As an example, one may look at the last one million queries that were posed to a search engine and find what percentage of these queries were similar to (e.g., in a same query-type group as) the current query.

It will be appreciated that, while the above embodiments describe particular query features that can be used to help determine whether a query is temporal (or not), the techniques and systems described herein are not limited to these examples. Those skilled in the art may devise alternate query features that can be collected and used to determine a temporal nature of the query. For example, there are many and varied statistics that can be used to track how queries are posed and interacted with, which may be used as query features.

Turning back to FIG. 1, at 108 in the exemplary method 100, the one or more query features are input into a trained classifier, and the query is classified is temporally-based (or not) by the classifier. For example, in one embodiment, an "off-the-shelf" baseline machine learning algorithm may be used as a query classifier. In this embodiment, the classifier can be initially trained with a set of labeled queries indicating temporally positive (temporal) and temporally negative (non-temporal) queries, comprising query features. In this way, for example, the classifier can be trained to identify temporal queries using query features. In this embodiment, the features of the query in question can be input to the trained classifier to determine if the query is temporal (or not).

Figure 3:
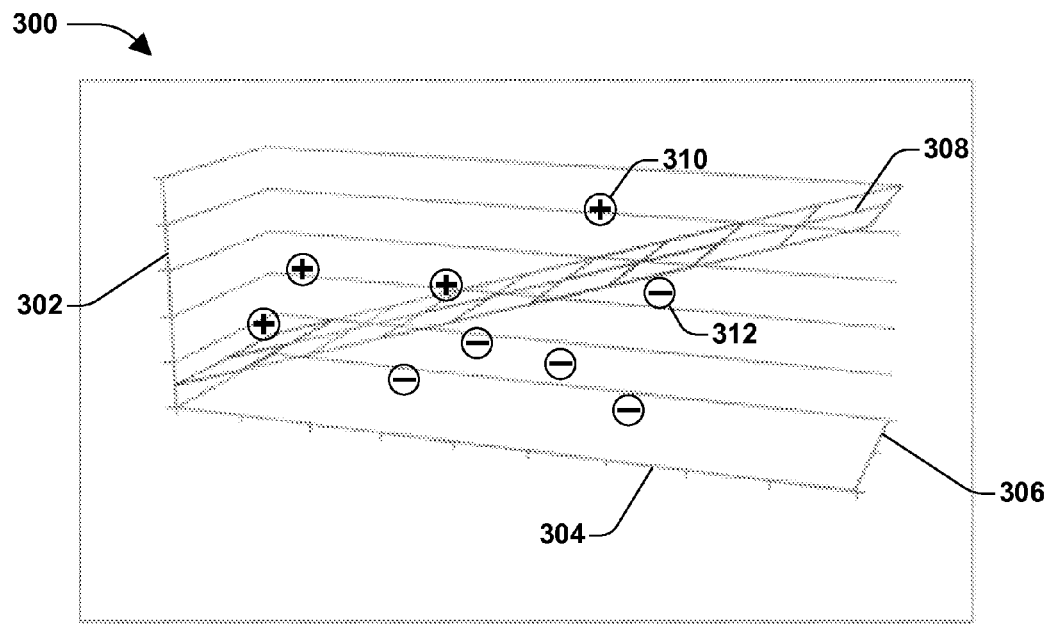
FIG. 3 is a graphical illustration of an example feature space representation comprising half-space.

In an alternate embodiment, as shown in FIG. 2 at 234, feature space may be utilized for query classification. For example, a multi-dimensional representation of query features can be used to describe specific queries relative to their features. At 236, a query's features may be run through a function that computes corresponding coordinates in the feature space as a vector of coordinates. FIG. 3 is a graphical illustration of an example feature space representation 300, comprising three-axes 302, 304, and 306. In this embodiment 300, the axes 302, 304, and 306 may represent three different query features that can be used to mark coordinates of a vector comprising the three query features.

For example, three features collected for a query can be represented as a vector of coordinates in feature space. In this example, the vector of coordinates for the query can be calculated by running them through a function that computes corresponding feature space coordinates for a query, using the three axes 302, 304, and 306. The example feature space representation 300 illustrates a hyper-plane 308 that can be used to graphically represent a separation of the feature space into temporal 310 and non-temporal 312 regions.

At 238 in the exemplary embodiment 200, if the resulting vector of coordinates for the query, as determined by a classification function is within a temporally based query region of the feature space, the query can be classified and labeled as temporal 310. Further, at 240, if the vector of coordinates for the query is within a non-temporally based query region of the feature space, the query can be classified and labeled as non-temporal 312.

Turning back to FIG. 1 again, at 110 of the exemplary method 100, if the query is classified as temporally-based, results for the query are shifted. At 112, shifting results for the query comprises determining an alternate set of results for the query. As described above, a query may have different meanings to different users at different times. In one embodiment, a query may comprise one word or a series of words aggregated to describe a common theme, for example.

As an example, where a common result for the query "earthquake" may return results related to earthquake research centers, basic earthquake information, and lists of important earthquakes, alternate results may comprise current news about an earthquake that just occurred, the movie earthquake, earthquake the band, an earthquake drink, and others. In one embodiment, a search engine may be used to identify alternate results for the query as a second set of results, for example, by filtering out terms related to a first set of results initially returned for the query. In this embodiment, the second set of results can have different characteristics than the first set of results, for example, because characteristic terms related to the first set of results can be filtered out of the second set.

At 114 of the exemplary method 100, one or more alternate results from the set of alternate results are returned to one or more users. In one embodiment, in order to determine if the query is actually temporal, for example, a good indicator may be whether a user selects alternate results when they are shown to the user. In this example, selecting alternate results may indicate that the first set of results were not what the user was looking for, as a meaning of their query had changed to the selected alternate result.

In another embodiment, in order to determine whether the query is actually temporally-based, and/or to gather a larger sampling of desired alternate results, respective alternate results can be shown to multiple users, multiple times. In this embodiment, for example, a click-through rate of the second set comprising alternate results can be determined. Further, in this embodiment, those alternate results having a higher selection rate (click-through rate) by users can be compared with a number of times the alternate rates have been shown to users to determine desired alternate results.

Figure 5:
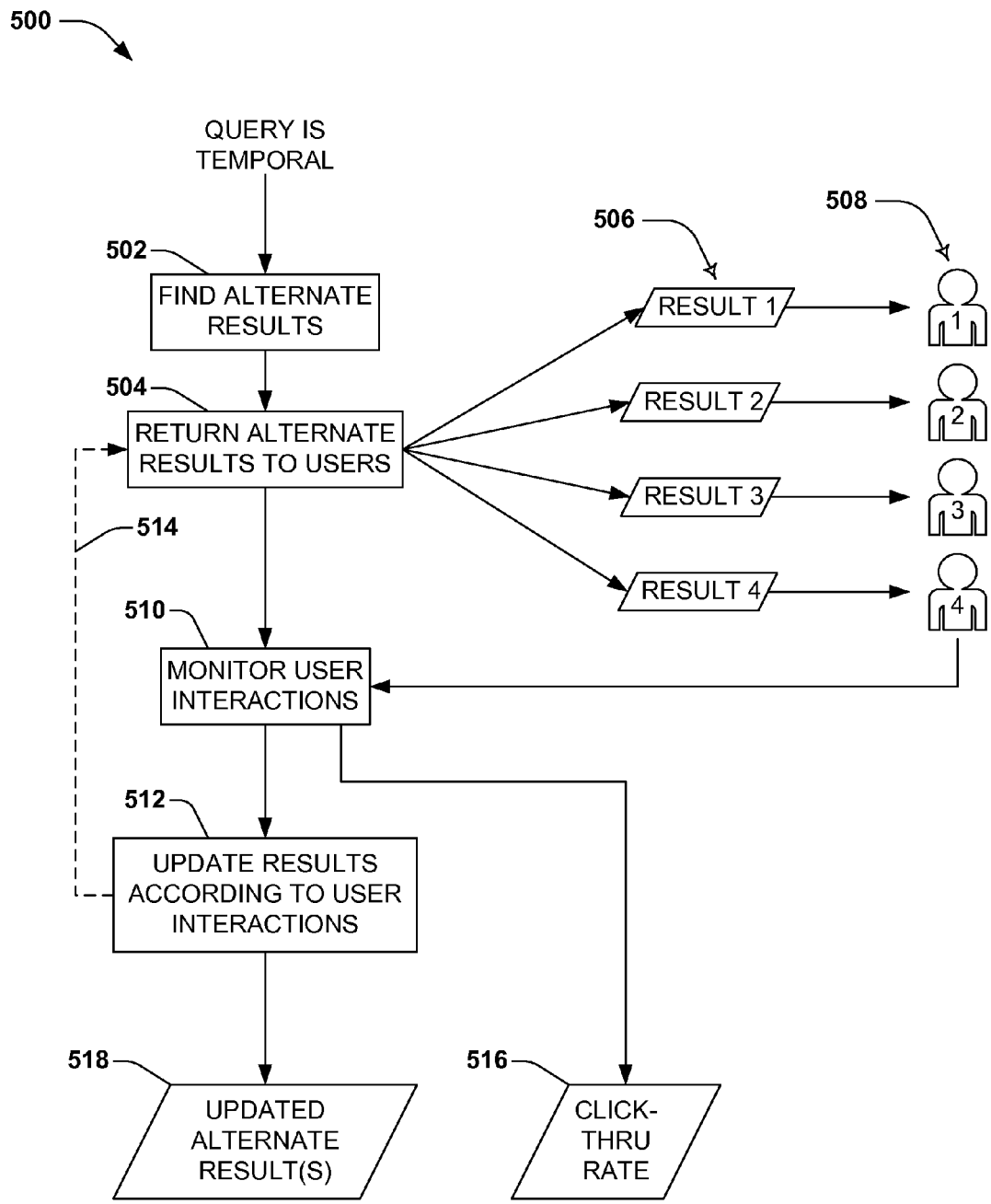
FIG. 5 is a flow diagram of an exemplary embodiment of a portion of a method, where desired alternate results are selected and a click-through rate for the alternate results is determined.

FIG. 5 is a flow diagram of an exemplary embodiment 500 of a portion of a method, where desired alternate results are selected and a click-through rate for the alternate results is determined. In the exemplary embodiment 500, when a query is determined to be temporal (e.g., by the classifier) a set of alternate results are determined for the query, at 502, as described above.

At 504, respective alternate results 506 in the set can be returned to a different user 508. In this example 500, a first result 506 from the set is returned to a first user 508, a second result 506 to a second user 508 and so-on. At 510, user interactions with the returned results 506 can be monitored to determine, for example, click-through rates 516 for the respective results 506.

At 512, the alternate results can be adjusted, for example, a new set or an order of the results can be selected, according to how the users interacted with the initial results 506 returned to the users 508. The updated alternate results can be returned to the users, at 504, and user interactions with these results can be monitored at 510. The loop back 514 to return updated alternate results can continue, for example, until a desired set of updated alternate results 518 is selected.

In one embodiment, a multi-armed bandit type algorithm may be utilized to determine the desired updated alternate results for a query. For example, let $x_j$ denote an average number of click-throughs on a returned result (j), $n_j$ denote a number of times j has been shown to a user, and n denote a number of times the query has been posed. In this example, returned results j can be explored by $x_j+\text{sqrt}((2 \ln n)/n_j)$ until a desired result is established within a desired confidence. In this way, in this example, one or more desired updated alternate results 518 can be determined for the query.

In an alternate embodiment, instead of using a multi-armed bandit type algorithm to select a desired alternate result, a returned result can be selected that yields a desired (e.g., highest) number of clicks at the time of selection. For example, if a first alternate result 506 is clicked on by users 508 more often that the other results 506, the updated alternate results 518 may merely comprise the first alternate result.

Returning again to FIG. 1, at 116 in the exemplary method 100, the classification of queries is updated, based on the one or more users' interactions with the one or more alternate results. In one embodiment, if user interactions with the alternate results indicate that the query is temporal, for example, the initial classification of the query was accurate and the query classification may not need to be updated. However, in this embodiment, if user interactions with the alternate results indicate that query is not temporal, for example, the initial classification of the query was incorrect and the query classification may need to be updated to reflect a non-temporal nature for the query.

Figure 6:
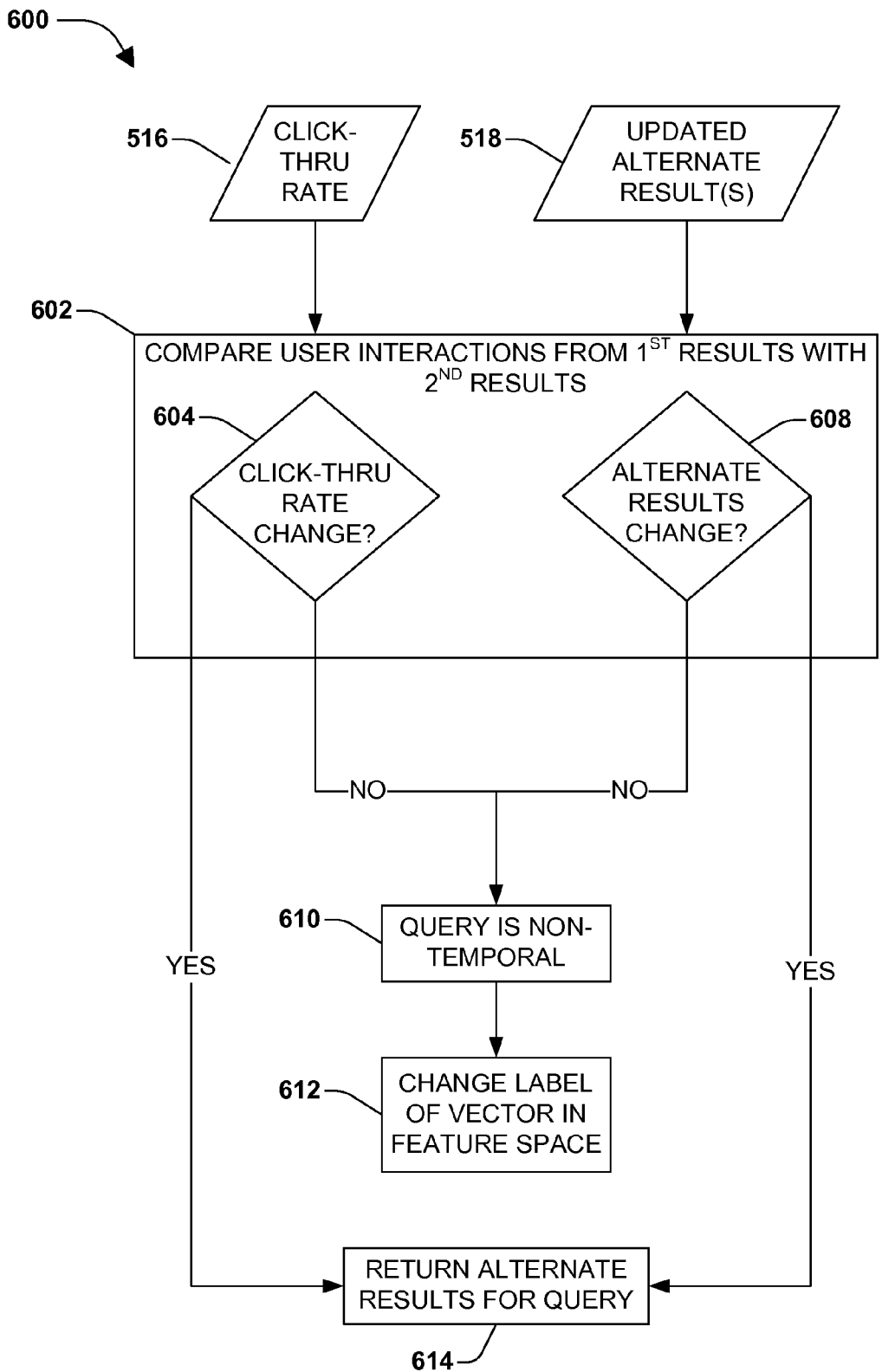
FIG. 6 is a flow diagram of an exemplary embodiment of a portion of a method, where query classification may be updated using user interactions with alternate results.

FIG. 6 is a flow diagram of an exemplary embodiment 600 of a portion of a method, where query classification may be updated using user interactions with alternate results. At 602, user interactions with the first set of results can be compared to the user interactions with the second set of results (alternate results) for the query. For example, the click-through rates 516 can be compared with each other, and the one or more updated alternate results 518 can be compared with the first set of results for the query. It will be appreciated that first and second are merely used herein to identify different results (e.g., original versus altered results), and that the disclosure herein is not meant to be limited thereby (e.g., to two results). That is, the disclosure herein is not meant to be limited to merely two possible alternate results, as there may, in fact, be multiple possible alternate results.

In this embodiment 600, at 604, if a distribution of a click-through rate 516 for the second set of returned results is unchanged from the first set of returned results, within a desired threshold margin, the query is determined to be non-temporal, at 610. For example, if initial results returned for a query, such as web-page links returned for a query search using a search engine, yielded no click-throughs, and the alternate set of results yields no click-throughs, the query may not be temporally-based merely bad results or a bad query. However, if the click-through rates differ enough that the difference is outside of a desired threshold margin (e.g., 5% difference), the alternate results may be returned to users, at 614.

At 608, if the alternate set of results is changed to a set of one or more results that is similar to the first set of one or more results returned by the search engine, within a desired threshold margin, the query is determined to be non-temporal, at 610. For example, in the FIG. 5, in one embodiment, one or more desired alternate results can be determined based on user interactions with returned alternate results. In this embodiment, the updated alternate result may be changed back to a similar result returned for the initial query, for example, where alternate results are repeatedly returned to users without additional user interactions. In this example, the query would be considered non-temporal if the updated alternate results 518 end up being similar to the first set returned for the query. However, if the updated alternate results differ enough that the difference is outside of a desired threshold margin, the alternate results may be returned to users, at 614.

At 612, if the query is determined to be non-temporal, updating the query classification comprises changing a label for the query represented as a vector of coordinates in feature space (e.g., as described in FIG. 2, 200, at 234) to non-temporal. In one embodiment, queries are initially assumed to be temporal, and labeled as such in the feature space, such as 310 in the exemplary embodiment 300 of FIG. 3. However, if a query is found to be non-temporal, the label of the vector can be changed to non-temporal 312. Further, because the vector is changed to non-temporal, a margin 308 that separates temporal space from non-temporal space may need to be adjusted so that the recently changed vector is included in the non-temporal space of the feature space.

Figure 4:
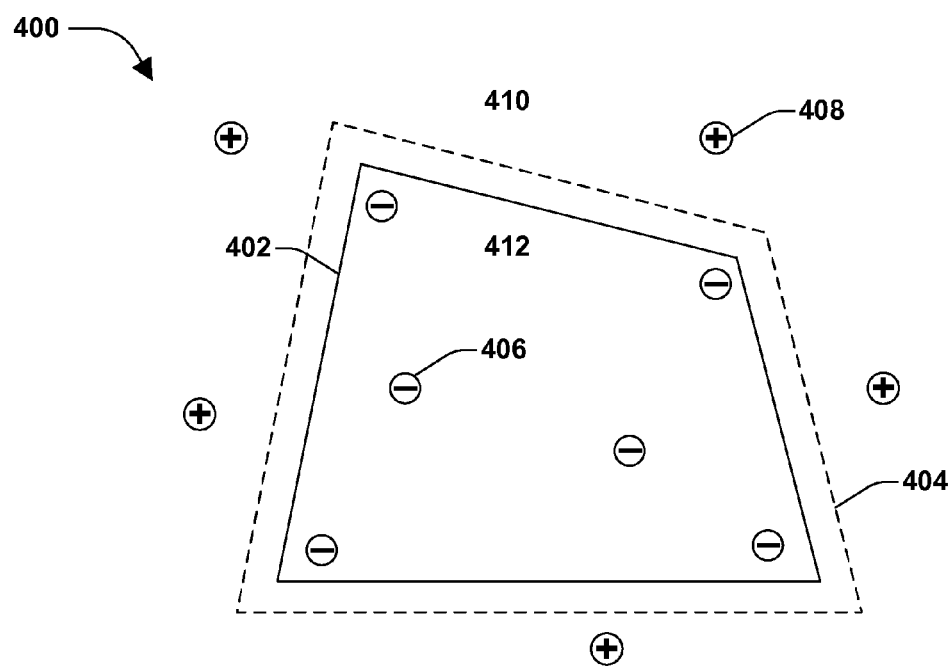
FIG. 4 is a graphical illustration of an example feature space representing multiple axes.

FIG. 4 is a graphical illustration of an alternate representation 400 of feature space, where more than three axes may be utilized to represent features of the query, for example, the temporal region can be described by an intersection of half-spaces, or equivalently a convex polytope. In this embodiment, a convex hull describes the border 402 that separates a temporal area 410 from a non-temporal area 412 in the feature space. As an example, initially, the convex hull 412 may be empty and if the feature vector for a first query is labeled as temporal 408, then that single point can constitute the temporal area. In this example, if the query is later found to be non-temporal, as described above, the label can be changed to non-temporal 406 and the feature space function, graphically represented as separating feature space using a border separating the temporal from the non-temporal area 402, can be suitably adjusted to incorporate the non-temporal vector within the non-temporal area of the convex hull 412. In this way, in this example, the margin of the convex hull 402 may merely be a size that can effectively incorporate the respective non-temporal vectors of the feature space within the non-temporal area 412.

Returning to FIG. 1, having updated the classification, the exemplary method 100 ends at 118.

In one aspect, the query classification can be updated by running queries through a feature space function and labeling vectors representing queries in feature space. As an example, by updating the trained classifier used to determine whether a query is temporal (e.g., essentially training the classifier further), the accuracy of the classifier can improve. For example, a set of features can be collected for a query, such as a click-through rate, abandonment rate, reformulation rate, frequency rate, and burstiness rate. In this example, the features can be represented as coordinates of a vector, for example, in the exemplary feature space 400 of FIG. 4. Further, if the vector falls within margin 402 describing the non-temporal area of the feature space, the query can be classified as non-temporal. Additionally, an area that comprises a margin of error 404 can be established around the margin 402 in order to mitigate a false negative classification of a query (e.g., classifying a query as non-temporal when it is actually temporal).

Figure 7:
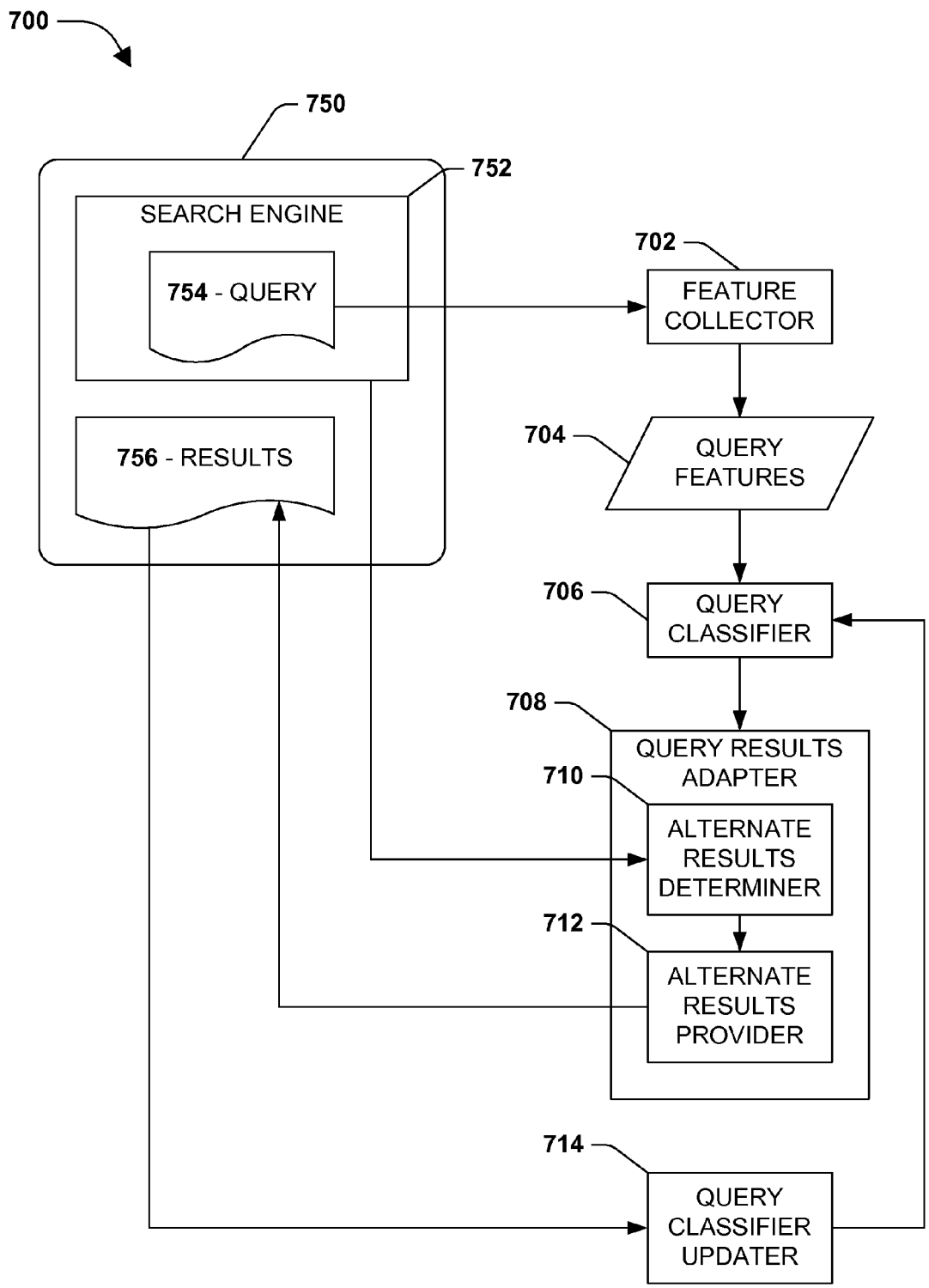
FIG. 7 is a component block illustrating an exemplary system for returning temporally-aware results from an Internet-based search query.

A system may be devised that can determine whether a query is temporally-based, such as a query that is associated with something having time relevance (e.g., news about an earthquake that just occurred), or a query whose meaning may have changed over time (e.g., Independence Day). FIG. 7 is a component block diagram of an exemplary system 700 for returning temporally-aware results from an Internet-based search query.

The exemplary system 700 comprises a feature collector 702 that is configured to collect features of an Internet-based search query 754. For example, a user may pose a query in a search engine 752 on a website 750. The feature collector 702 can retrieve query features 704, for example, based on information collected by the search engine 752. Query features 704 can be sent to a query classifier 706, operably coupled to the feature collector 702, which is configured to classify whether a query is temporal based on features provided by the feature collector 702.

Figure 8:
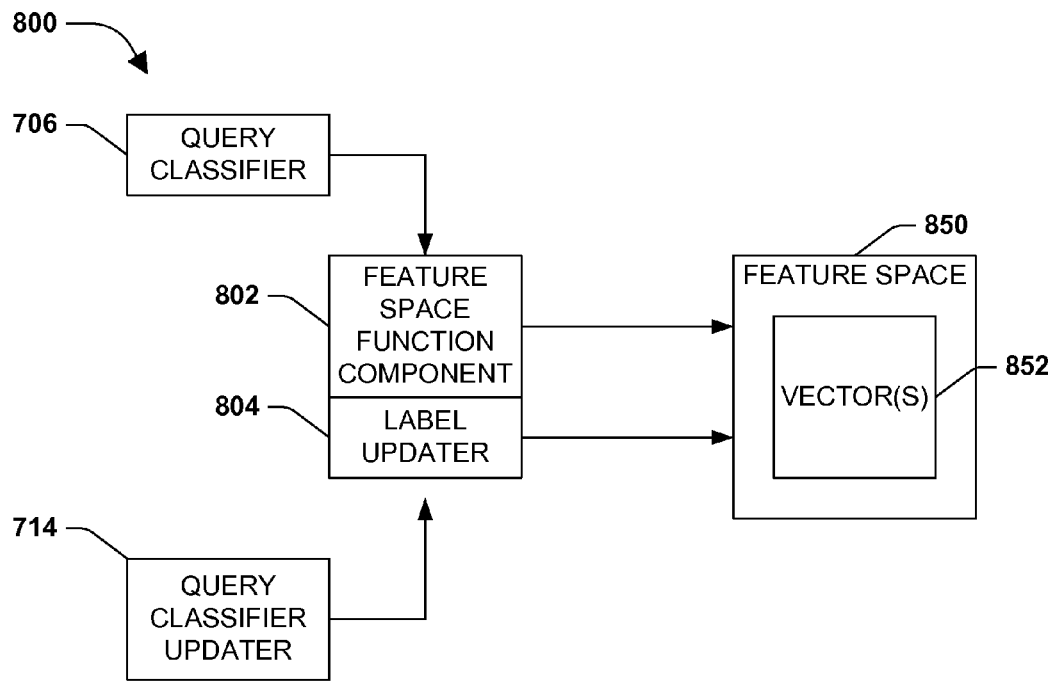
FIG. 8 is an exemplary embodiment of a portion of a system, where a function of query features can be plotted, calculated and/or updated in feature space.

In one embodiment, as illustrated in the exemplary portion of a system 800 for calculating a function of the query features in feature space and updating labels, in FIG. 8, the query classifier 706 can send query feature information to a feature space function component 802. In this exemplary embodiment 800, the feature space function component 802 is operably coupled to the query classifier 706, and is configured to calculate a vector of coordinates 852 for features of the query in feature space 850, and label the calculated vector of coordinates 852 for the query according to its location in the feature space 850. In one embodiment, the temporal nature determination for the query by the query classifier 706 determines a label for its corresponding vector 852 by using a feature space function to compute a feature vector for the query and determine whether the feature vector lies on the temporal or non-temporal side of the temporal region.

In FIG. 7, the exemplary system 700 further comprises a query results adapter 708 that is configured to provide alternate results 756 for the query 754 if the query classifier 706 determines that the query 754 is temporal. The query results adapter 708 comprises an alternate results determination component 710, which is configured to use the search engine 752 to determine a second set of results 756 having different characteristics than a first set of results provided by the search engine, such as results that reflect different meanings for the query. Further, the query results adapter 708 comprises an alternate results provider 712 that is configured to provide alternate results 756 for one or more users, such as other users of the search engine 752.

Figure 9:
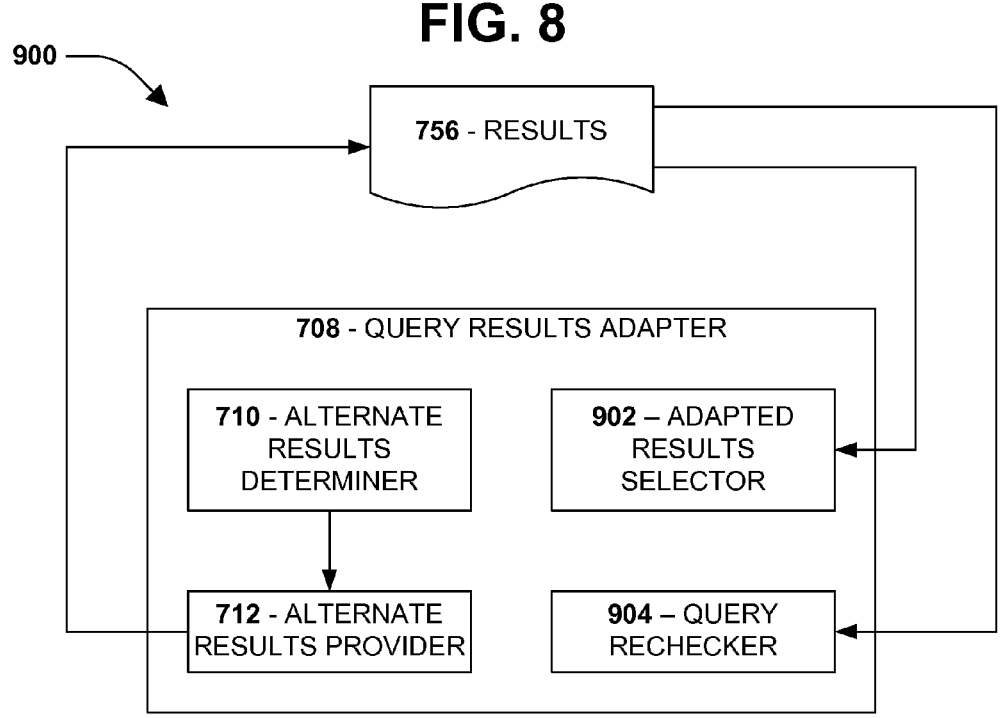
FIG. 9 is a component block diagram of an exemplary embodiment of a portion of a system, where desired query results can be selected and a temporal nature of a query can be rechecked.

FIG. 9 is a component block diagram of an exemplary embodiment 900 of a portion of a system, where desired query results can be selected and a temporal nature of a query can be rechecked. In this embodiment, the query results adapter 708 comprises an adapted results selector 902 that is configured to compare a function of a click-through rate on returned alternate results 756 with a function of a number of times corresponding returned alternate results 756 have been shown to users to provide a set of one or more desired alternate results. For example, the adapted results selector 902 can look at how many times an alternate result 756 is shown for a query, how many times the query is posed, and how many times the alternate result 756 is clicked on when returned to one or more users to determine which of the alternate results in the set of alternate results 756 may be desired by users.

Further, in this embodiment 900, the query results adapter 708 comprises a query rechecker 904 configured to determine whether the query is temporal based on user interaction with the set of one or more alternate results. For example, the alternate results determiner 710 can determine a second set of results 756 (e.g., different than the first set of results for the query), which can be provided to one or more users. In this example, how the one or more users interact with the alternate results 756, such as click-through rates, may be used by the query rechecker 904 to determine whether the query is actually temporal. If alternate results are determined for a query, for example, the query is considered temporal; however, if the click-through rates are similar to the click-through rates for the first set of results, the query may actually be non-temporal.

Returning to FIG. 7, the exemplary system 700 further comprises a query classifier updating component 714 that is configured to update the query classifier 706 to incorporate results from one or more users' interactions with the alternate results 756 for a query 754. In one embodiment, as shown in the exemplary embodiment 800 of FIG. 8, the query classifier updating component 714 can be coupled with a label updater 804. The label updater 804 can be configured to update the label of the query vector 852 in feature space based on results from the query classifier updating component 714. Further, it may generate separate temporally-based query regions and a non-temporally based query regions in the feature space 850 for respective queries.

For example, if a query is determined to be non-temporal, this information can be passed to the label updater 804. In this example, the label updater 804 can change the label of the vector 852 for the query in feature space 850 from temporal to non-temporal. Further, in one embodiment, a border that separates the non-temporal from temporal areas of the features space, such as shown in FIG. 3, 308 and FIG. 4, 402, can be adjusted to incorporate the label that was changed. For example, in 300 and 400, if a temporal vector 310 or 408 is changed to a non-temporal vector 312 or 406, its location does not change, but the margin 308 or 402 will be moved to include the changed vector in the non-temporal area of the feature space.

In another embodiment, the separation between the non-temporal from the temporal areas comprises a border. In this embodiment, the border area can describe a hyper plane that separates the features space into half space, as in FIG. 3, 308. Further, the border area can describe a convex hull in the feature space, such as FIG. 4, 402. Additionally, the border area can describe a hyper-rectangle separating the feature space. For example, a hyper rectangle may comprise a rectangular area that completely encompasses respective non-temporal vectors (e.g., in a smallest rectangle) in the feature space.

In another embodiment, a border in feature space can comprise a delta region that mitigates false negative determinations for queries. In this embodiment, for example, the delta region may be a desired error margin that incorporates potential vectors that may actually be non-temporal, thereby mitigating a possibility that a vector falling within this delta region is labeled as temporal, when it is actually non-temporal. In FIG. 4, 400, an exemplary delta region is described at 404.

Figure 10:
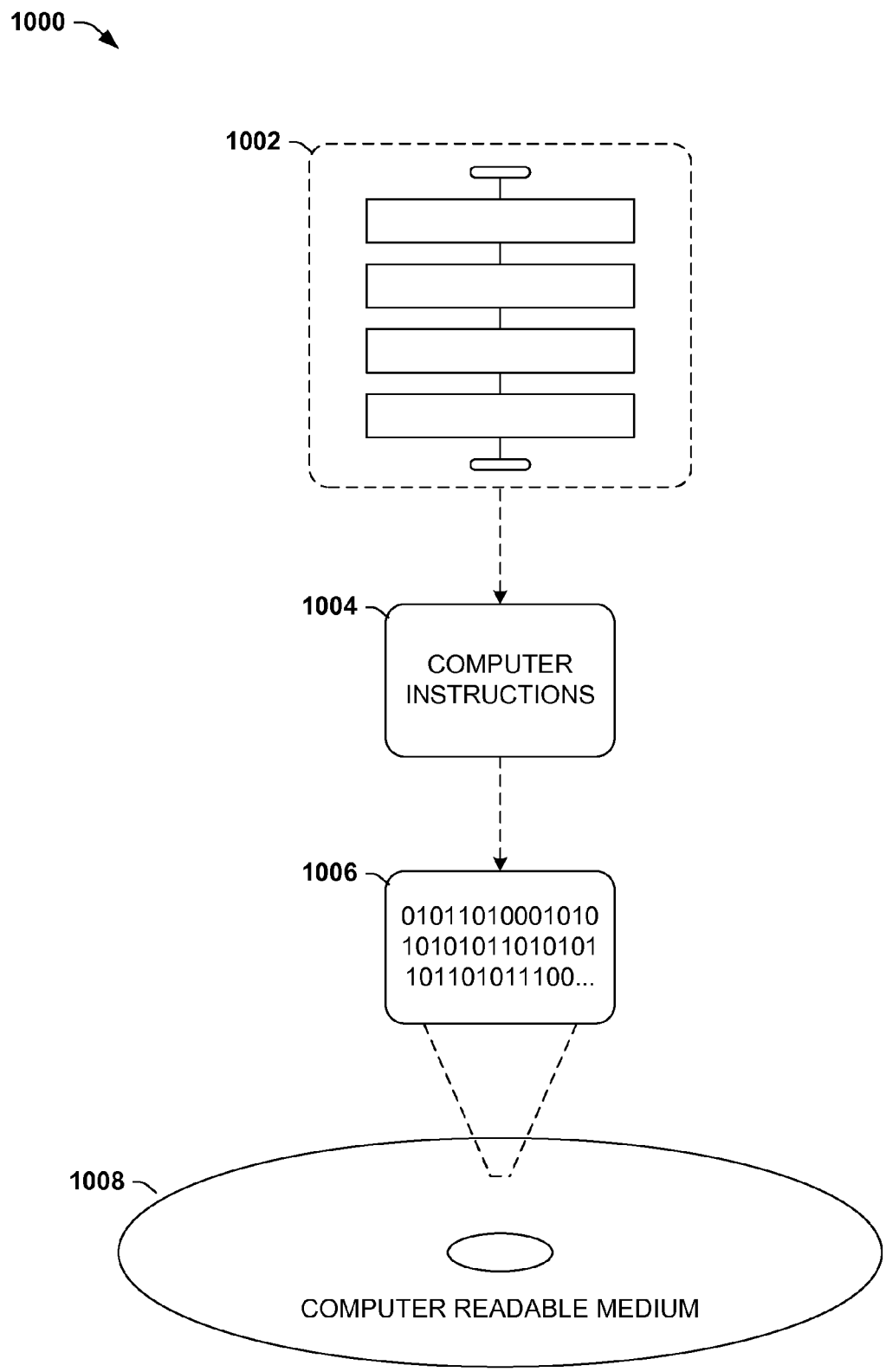
FIG. 10 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 10, wherein the implementation 1000 comprises a computer-readable medium 1008 (e.g., a CD-R, DVD-R, or a platter of a hard disk drive), on which is encoded computer-readable data 1006. This computer-readable data 1006 in turn comprises a set of computer instructions 1004 configured to operate according to one or more of the principles set forth herein. In one such embodiment 1002, the processor-executable instructions 1004 may be configured to perform a method, such as the exemplary method 100 of FIG. 1, for example. In another such embodiment, the processor-executable instructions 1004 may be configured to implement a system, such as the exemplary system 700 of FIG. 7, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 11:
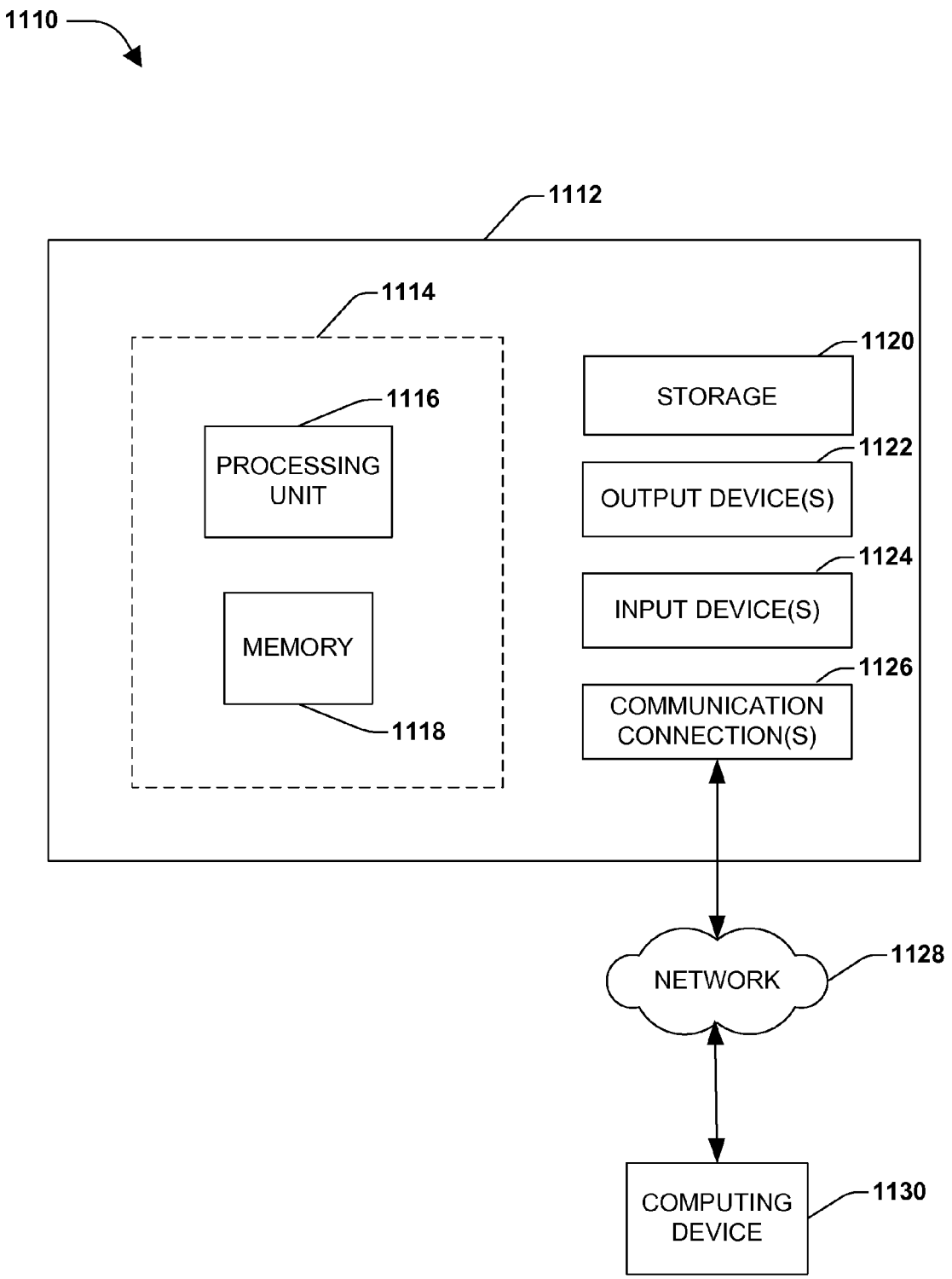
FIG. 11 illustrates an exemplary computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1110 comprising a computing device 1112 configured to implement one or more embodiments provided herein. In one configuration, computing device 1112 includes at least one processing unit 1116 and memory 1118. Depending on the exact configuration and type of computing device, memory 1118 may be volatile (such as RAM, for example), non-volatile (such as ROM, flash memory, etc., for example) or some combination of the two. This configuration is illustrated in FIG. 11 by dashed line 1114.

In other embodiments, device 1112 may include additional features and/or functionality. For example, device 1112 may also include additional storage (e.g., removable and/or non-removable) including, but not limited to, magnetic storage, optical storage, and the like. Such additional storage is illustrated in FIG. 11 by storage 1120. In one embodiment, computer readable instructions to implement one or more embodiments provided herein may be in storage 1120. Storage 1120 may also store other computer readable instructions to implement an operating system, an application program, and the like. Computer readable instructions may be loaded in memory 1118 for execution by processing unit 1116, for example.

The term "computer readable media" as used herein includes computer storage media. Computer storage media includes volatile and nonvolatile, removable and non-removable media implemented in any method or technology for storage of information such as computer readable instructions or other data. Memory 1118 and storage 1120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1112. Any such computer storage media may be part of device 1112.

Device 1112 may also include communication connection(s) 1126 that allows device 1112 to communicate with other devices. Communication connection(s) 1126 may include, but is not limited to, a modem, a Network Interface Card (NIC), an integrated network interface, a radio frequency transmitter/receiver, an infrared port, a USB connection, or other interfaces for connecting computing device 1112 to other computing devices. Communication connection(s) 1126 may include a wired connection or a wireless connection. Communication connection(s) 1126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1112 may include input device(s) 1124 such as keyboard, mouse, pen, voice input device, touch input device, infrared cameras, video input devices, and/or any other input device. Output device(s) 1122 such as one or more displays, speakers, printers, and/or any other output device may also be included in device 1112. Input device(s) 1124 and output device(s) 1122 may be connected to device 1112 via a wired connection, wireless connection, or any combination thereof. In one embodiment, an input device or an output device from another computing device may be used as input device(s) 1124 or output device(s) 1122 for computing device 1112.

Components of computing device 1112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1112 may be interconnected by a network. For example, memory 1118 may be comprised of multiple physical memory units located in different physical locations interconnected by a network.

Those skilled in the art will realize that storage devices utilized to store computer readable instructions may be distributed across a network. For example, a computing device 1130 accessible via network 1128 may store computer readable instructions to implement one or more embodiments provided herein. Computing device 1112 may access computing device 1130 and download a part or all of the computer readable instructions for execution. Alternatively, computing device 1112 may download pieces of the computer readable instructions, as needed, or some instructions may be executed at computing device 1112 and some at computing device 1130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-implemented method for returning temporally aware results for a query, comprising:
    identifying a first set of results for a query, the first set of results non-temporally based;
    classifying whether the query is temporally based by inputting one or more features of the query into a trained classifier to assign a classification to the query;
    if the query is classified as temporally based, determining an alternate set of results for the query different than the first set of results; and
    updating the classification based upon user interaction with the alternate set of results, comprising:
        representing the one or more features of the query as a vector of coordinates in feature space, the vector of coordinates assigned a temporally based label if the query is classified as temporally based; and
        if the user interaction with the alternate set of results indicates the query is non-temporally based and the vector of coordinates is assigned the temporally based label, then:
            modifying the temporally based label assigned to the vector of coordinates to a non-temporally based label; and
            updating a margin separating a temporally-based query region and a non-temporally based query region in the feature space, at least some of at least one of the identifying, the classifying, the determining, and the updating the classification implemented at least in part via a processor.

2. The method of claim 1, comprising:
    assigning the temporally based label to the vector of coordinates if the vector of coordinates is within the temporally-based query region of the feature space.

3. The method of claim 1, comprising:
    assigning the non-temporally based label to the vector of coordinates if the vector of coordinates is within the non-temporally based query region of the feature space.

4. The method of claim 1, comprising:
    collecting one or more features of the query comprising at least one of:
        determining how a user interacts with the first set of results returned for the query;
        determining characteristics of the query; and
        determining statistical-based characteristics of one or more of:
            burstiness of user interactions with the first set of results returned for the query;
            geographical location related to the query;
            age of a document resulting from the query;
            age of a selected document in the first set of results;
            a desired number of recent queries that are similar to the query; and
            a desired number of recent news queries that are similar to the query.

5. The method of claim 1, the determining an alternate set of results comprising:
    using a search engine to identify the alternate set of results comprising different characteristics than characteristics of the first set of results.

6. The method of claim 1, the updating the classification comprising:
    comparing the user interaction with the alternate set of results to initial user interactions with the first set of results.

7. The method of claim 6, the updating the classification comprising:
    if the user interaction with the alternate set of results deviates from the initial user interactions with the first set of results below a threshold margin, then classifying the query as non-temporally based.

8. The method of claim 1, the updating the classification comprising:
    if characteristics of the alternate set of results deviates from characteristics of the first set of results below a threshold margin, then classifying the query as non-temporally based.

9. A computer-implemented system for returning temporally aware results for a query, comprising:
    an alternate results determination component configured to determine an alternate set of results for a query different than a first set of results for the query if the query is classified as temporally based;
    a feature space function component configured to:
        represent one or more features of the query as a vector of coordinates in feature space, the vector of coordinates assigned a temporally based label if the query is classified as temporally based; and
        if user interaction with the alternate set of results indicates the query is non-temporally based and the vector of coordinates is assigned the temporally based label, then:
            modify the temporally based label assigned to the vector of coordinates to a non-temporally based label; and
            update a margin separating a temporally-based query region and a non-temporally based query region in the feature space, at least some of at least one of the alternate results determination component and the feature space function component implemented at least in part via a processor.

10. The system of claim 9, the first set of results non-temporally based.

11. The system of claim 9, the feature space function component configured to:

assign the temporally based label to the vector of coordinates if the vector of coordinates is within the temporally-based query region of the feature space.

12. The system of claim 9, the feature space function component configured to:
assign the non-temporally based label to the vector of coordinates if the vector of coordinates is within the non-temporally based query region of the feature space.

13. A computer readable storage medium comprising instructions that when executed perform a method for returning temporally aware results for a query, comprising:
identifying a first set of results for a query, the first set of results non-temporally based;
classifying whether the query is temporally based by inputting one or more features of the query into a trained classifier to assign a classification to the query;
if the query is classified as temporally based, determining an alternate set of results for the query different than the first set of results; and
updating the classification based upon user interaction with the alternate set of results, comprising:
representing the one or more features of the query as a vector of coordinates in feature space, the vector of coordinates assigned a temporally based label if the query is classified as temporally based; and
if the user interaction with the alternate set of results indicates the query is non-temporally based and the vector of coordinates is assigned the temporally based label, then:
modifying the temporally based label assigned to the vector of coordinates to a non-temporally based label; and
updating a margin separating a temporally-based query region and
a non-temporally based query region in the feature space.

14. The computer readable storage medium of claim 13, the method comprising:
collecting one or more features of the query comprising at least one of:
determining how a user interacts with the first set of results returned for the query;
determining characteristics of the query; and
determining statistical-based characteristics of one or more of:
burstiness of user interactions with the first set of results returned for the query;
geographical location related to the query;
age of a document resulting from the query;
age of a selected document in the first set of results;
a desired number of recent queries that are similar to the query; and
a desired number of recent news queries that are similar to the query.

15. The computer readable storage medium of claim 13, the method comprising:
returning a first alternate result comprised within the alternate set of results to a first user and a second alternate result comprised within the alternate set of results to a second user.

16. The computer readable storage medium of claim 13, one or more characteristics associated with the alternate set of results different than one or more characteristics associated with the first set of results.

17. The computer readable storage medium of claim 13, the method comprising:
re-classifying the query as non-temporally based if one or more characteristics associated with the alternate set of results deviate from one or more characteristics associated with the first set of results below a threshold margin.

18. The computer readable storage medium of claim 13, the method comprising:
using a search engine to identify the alternate set of results.

19. The computer readable storage medium of claim 13, the method comprising:
returning one or more results based upon a comparison of one or more characteristics associated with the alternate set of results to one or more characteristics associated with the first set of results.

20. The computer readable storage medium of claim 13, one or more characteristics associated with the alternate set of results comprising an interaction with the alternate set of results, one or more characteristics associated with the first set of results comprising an initial interaction with the first set of results.

* * * * *